(12) United States Patent
Yamamoto

(10) Patent No.: US 10,409,636 B2
(45) Date of Patent: Sep. 10, 2019

(54) APPARATUS AND METHOD TO CORRECT AN EXECUTION TIME OF A PROGRAM EXECUTED BY A VIRTUAL MACHINE

(71) Applicant: FUJITSU LIMITED, Kawasaki-shi, Kanagawa (JP)

(72) Inventor: Masao Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 15/384,994

(22) Filed: Dec. 20, 2016

(65) Prior Publication Data

US 2017/0199761 A1 Jul. 13, 2017

(30) Foreign Application Priority Data

Jan. 13, 2016 (JP) .................................. 2016-004151

(51) Int. Cl.
*G06F 9/455* (2018.01)
*G06F 9/48* (2006.01)
*G06F 11/34* (2006.01)

(52) U.S. Cl.
CPC .......... *G06F 9/485* (2013.01); *G06F 9/45558* (2013.01); *G06F 11/3419* (2013.01); *G06F 11/3466* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 6,016,466 A | * | 1/2000 | Guinther | ............. G06F 11/3419 |
| | | | | 702/186 |
| 7,698,705 B1 | * | 4/2010 | Czajkowski | ............ G06F 9/485 |
| | | | | 718/1 |
| 2006/0156072 A1 | * | 7/2006 | Khot | .................... G06F 11/3612 |
| | | | | 714/47.2 |
| 2008/0222632 A1 | | 9/2008 | Ueno et al. | |

(Continued)

FOREIGN PATENT DOCUMENTS

| | | |
|---|---|---|
| JP | 2008-225655 | 9/2008 |
| JP | 2010-3057 | 1/2010 |

(Continued)

OTHER PUBLICATIONS

Yamamoto et al., "Unified Performance Profiling of an Entire Virtualized Environment", CANDAR, 2014, pp. 1-10.

(Continued)

*Primary Examiner* — Gregory A Kessler
(74) *Attorney, Agent, or Firm* — Staas & Halsey LLP

(57) ABSTRACT

An apparatus acquires, at each of times having a predetermined interval, first data identifying one of programs which is being executed at the each time by a virtual machine. When a first program is executed at a time before or after a steal time-period indicating a time-period during which a virtual machine program to operate the virtual machine is suspended, the apparatus outputs, in association with the first data identifying the first program, second data indicating a result of subtracting the steal time-period from an apparent execution time of the first program which indicates a time-period from a time of starting execution of the first program to a time of ending execution of the first program.

9 Claims, 12 Drawing Sheets

(56) References Cited

U.S. PATENT DOCUMENTS

2009/0319758 A1    12/2009   Kimura
2014/0259011 A1     9/2014   Tashiro et al.

FOREIGN PATENT DOCUMENTS

JP     2014-139702    7/2014
JP     2014-170482    9/2014

OTHER PUBLICATIONS

Yamamoto et al., "Unified Performance Profiling of an Entire Virtualized Environment", International Journal of Networking and Computing, vol. 6, No. 1, Jan. 2016, pp. 124-147.

Yamamoto et al., "Execution Time Compensation for Cloud Applications by Subtracting Steal Time based on Host-Level Sampling", Companion Publication for ACM/SPEC on International Conference on Performance Engineering, ICPE'16 Companion, Delft, Netherlands, Mar. 2016, pp. 69-73.

* cited by examiner

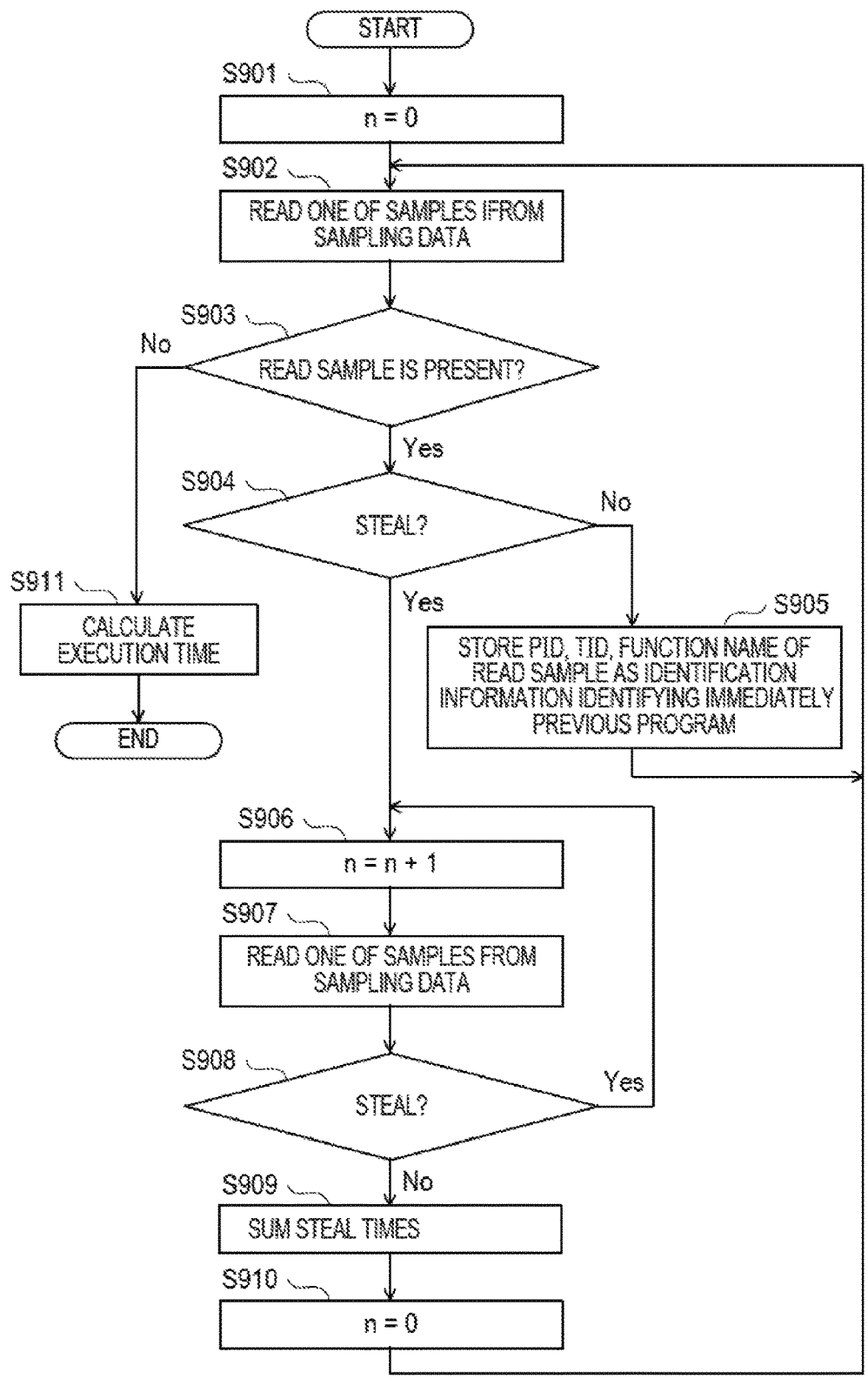

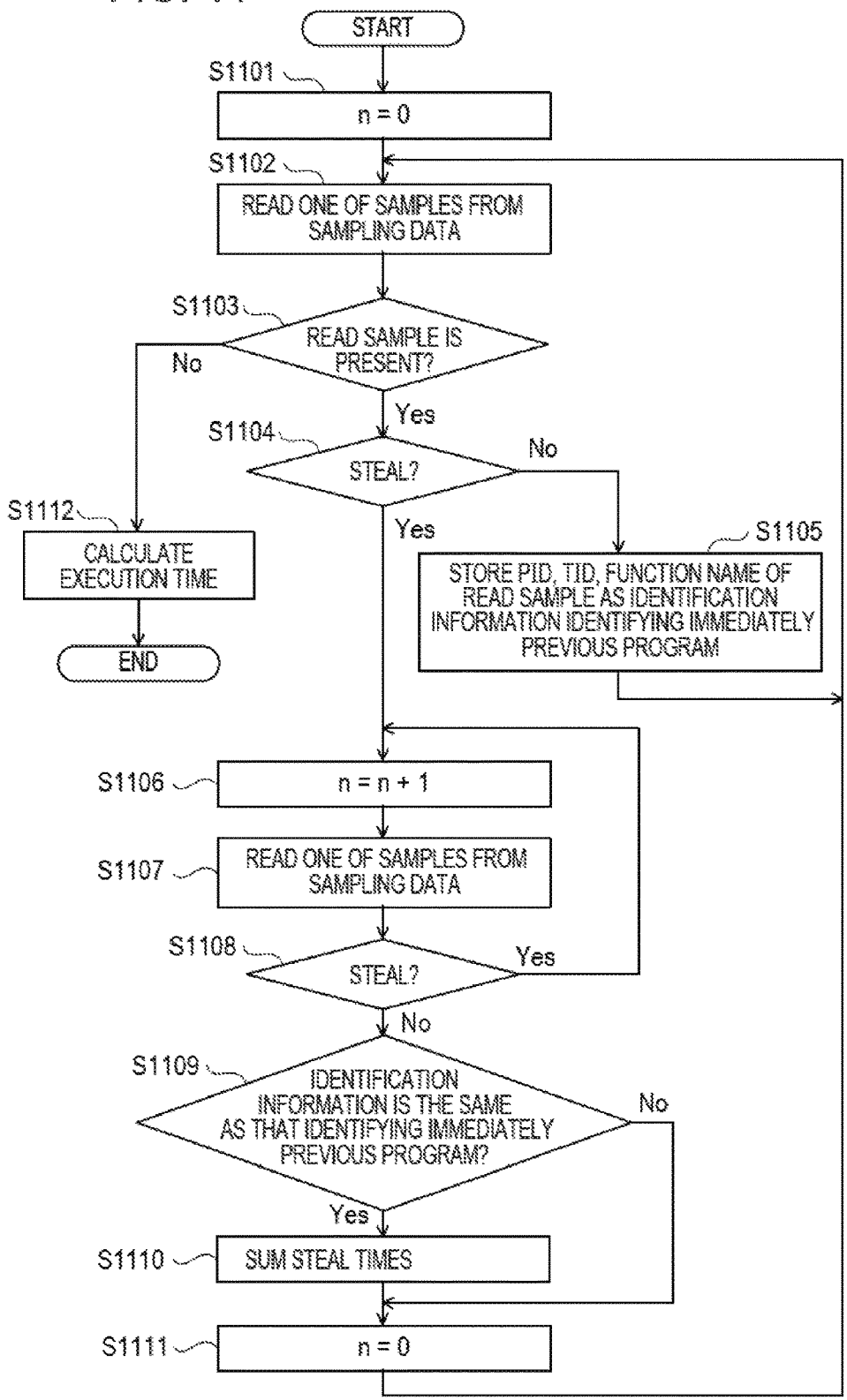

FIG. 12

| TYPE OF SAMPLE | % |
|---|---|
| PID=P, TID=T, FUNCTION NAME=F, [steal] | %(PID=P, TID=T, FUNCTION NAME=steal(F)) |
| PID=P, TID=T, [steal] | %(PID=P, TID=steal(T)) |
| PID=P, [steal] | %(PID=steal(P)) |
| ⋮ | ⋮ |

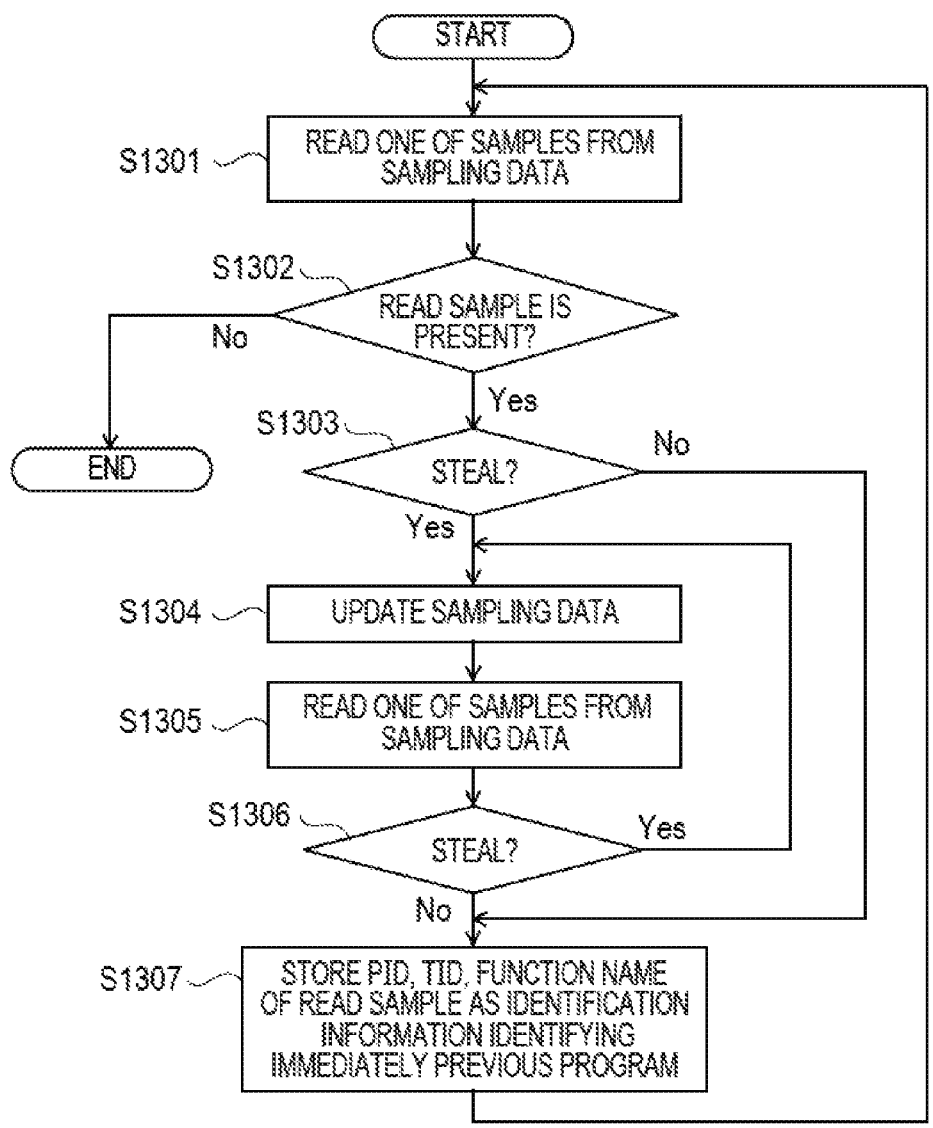

APPARATUS AND METHOD TO CORRECT AN EXECUTION TIME OF A PROGRAM EXECUTED BY A VIRTUAL MACHINE

CROSS-REFERENCE TO RELATED APPLICATION

This application is based upon and claims the benefit of priority of the prior Japanese Patent Application No. 2016-004151, filed on Jan. 13, 2016, the entire contents of which are incorporated herein by reference.

FIELD

The embodiment discussed herein is related to apparatus and method to correct an execution time of a program executed by a virtual machine.

BACKGROUND

Virtual machine systems that run a plurality of virtual machines (VMs) by controlling allocation of hardware resources to the virtual machines using a hypervisor have been developed. In virtual machine systems, an application program is executed by a guest operating system (OS) of each of the virtual machines.

For example, Japanese Laid-open Patent Publication No. 2008-225655 describes a virtual machine system that calculates the number of measurement times to be scheduled during a period of time during which a central processing unit (CPU) is not allocated to a logical partition. In addition, Japanese Laid-open Patent Publication No. 2010-003057 describes a technique in which if an application program is executed by an OS, the ID of a process executed by the application program is compared with the ID of a process of the application program to be measured. Furthermore, Japanese Laid-open Patent Publication No. 2014-139702 describes a technique to allocate, to a first process executed by a first guest OS, a physical private area and a virtual private area having addresses that differ from those of a physical private area and a virtual private area used by a second process executed by a second guest OS.

SUMMARY

According to an aspect of the invention, an apparatus acquires, at each of times having a predetermined interval, first data identifying one of programs which is being executed at the each time by a virtual machine. When a first program is executed at a time before or after a steal time-period indicating a time-period during which a virtual machine to operate the virtual machine is suspended, the apparatus outputs, in association with the first data identifying the first program, second data indicating a result of subtracting the steal time-period from an apparent execution time of the first program which indicates a time-period from a time of starting execution of the first program to a time of ending execution of the first program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of an operational flowchart for a calculation procedure, according to an embodiment;

FIG. 11 is a diagram illustrating an example of an operational flowchart for a calculation procedure, according to an embodiment;

FIG. 12 is a diagram illustrating an example of calculation of a steal time performed by an information processing apparatus, according to an embodiment; and FIG. 13 is a diagram illustrating an example of an operational flowchart for a calculation procedure, according to an embodiment.

DESCRIPTION OF EMBODIMENT

According to the above-described existing techniques, it may be difficult to accurately measure the execution time of each of the programs executed by a guest OS for each of programs. For example, it is difficult for a guest OS to measure a period of time during which each of the programs is suspended, for each of programs. As a result, it may be difficult to measure the execution time of each of the programs obtained by subtracting, from the total execution time, the period of time during which the program is suspended.

It is desirable to accurately measure the execution time of each of the programs executed by a virtual machine.

An information processing apparatus, an execution time correction method, and an execution time correction program according to the present disclosure are described in detail below with reference to the accompanying drawings.

Example of Execution Time Correction Method According to Embodiment

Figure 1:
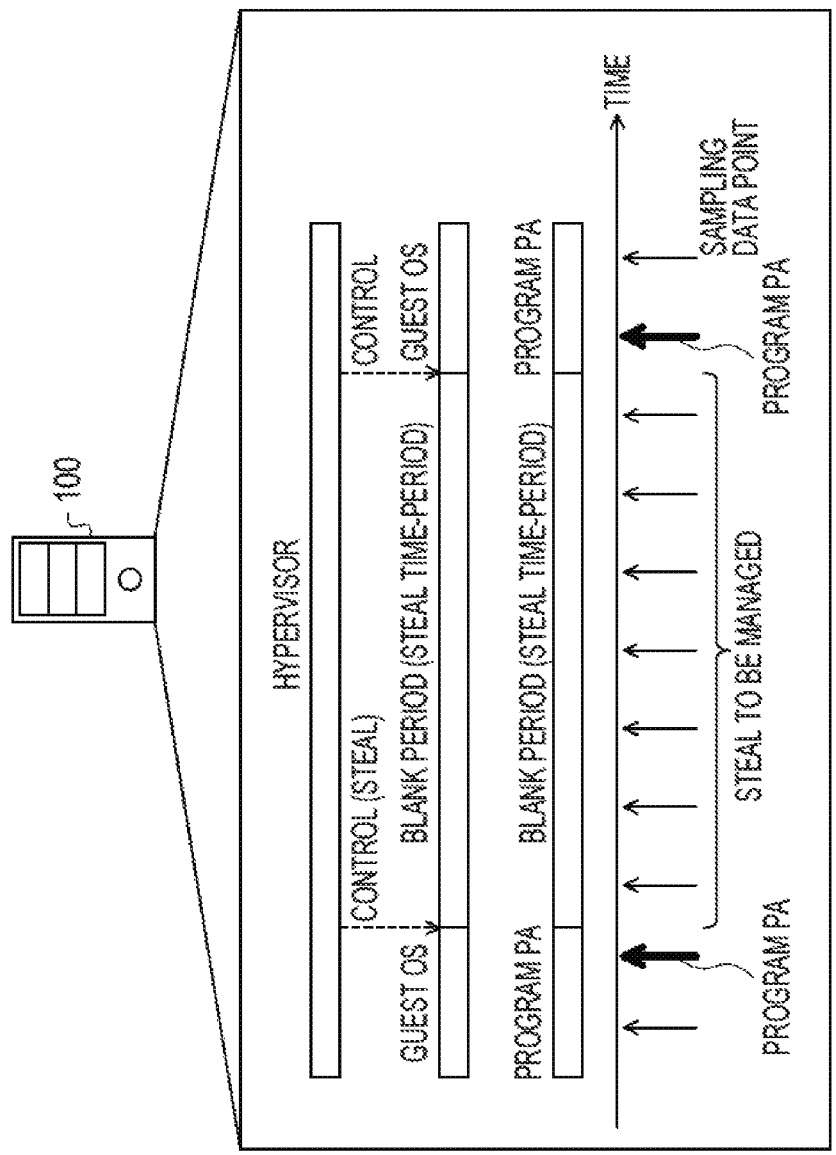
FIG. 1 is a diagram illustrating an example of an execution time correction method, according to an embodiment.

FIG. 1 illustrates an example of the execution time correction method according to an exemplary embodiment. In FIG. 1, an information processing apparatus 100 is a computer that identifies a suspended period of a program executed by a virtual machine program, for each of programs. Hereinafter, the term "virtual machine" is also simply referred to as a "VM".

Pay-as-you-go billing systems that charge users of a program on a server based on the usage time of the program have been used. In addition, in some cases, the execution time of the program is measured to analyze the performance of the program. As described above, sometimes, it is desired that the execution time of a program is measured for each of programs.

However, in some cases, it is difficult for a virtual machine system to accurately measure the execution time of a program executed under the control of a virtual machine program for each of programs. As used herein, the term "virtual machine program" refers to a program for operating a virtual machine. The virtual machine program is, for example, a guest OS. In the following description, the virtual machine program is also referred to as a "guest OS".

For example, hypervisor-based virtual machine systems have been developed. In hypervisor-based virtual machine systems, a hypervisor controls a guest OS dispatch process, emulation of a privileged instruction, I/O processing, and interrupt processing executed by a guest OS, scheduling of resources, and allocation of resources to VMs. At that time, the VM is temporarily suspended by the hypervisor (called "steal") for a certain period of time and, thus, the guest OS and a program executed by the guest OS are suspended. In the following description, such a period of time during which a VM and, accordingly, the guest OS and a program executed by the guest OS are suspended is also referred to as a "steal time-period".

In contrast, it is difficult for a guest OS and a program executed by a guest OS to detect that they are suspended by the hypervisor. Accordingly, when the guest OS and a program executed by a guest OS measure the execution time for each of programs, it is difficult for the guest OS and the program executed by the guest OS to measure the execution time so that the execution time does not include the length of time for the steal time-period. In the following description, the length of time for the steal time-period is also referred to as "steal time".

Alternatively, the steal time may be measured on a guest OS basis. However, even in such a case, it is difficult to obtain the steal time for each of the programs executed by the guest OS from the steal time measured on a guest OS basis. Accordingly, it is difficult to measure the execution time of a program executed by the guest OS for each of programs so that the execution time of a program does not include the steal time.

Note that in addition to the hypervisor-based virtual machine systems, host OS-based virtual machine systems have been developed. In host OS-based virtual machine systems, virtualization software is executed by a host OS. That is, in the virtual machine systems, the virtualization software controls a guest OS dispatch process, emulation of a privileged instruction, I/O processing, and interrupt processing executed by a guest OS, scheduling of resources, and allocation of resources to VMs.

At that time, like the hypervisor-based virtual machine systems, the VM may be temporarily suspended ("steal") and, thus, the guest OS and a program executed by the guest OS may be suspended for a certain period of time. Accordingly, like the hypervisor-based virtual machine system, it is difficult to measure the execution time for each of programs so that the execution time does not include the length of time for the steal time-period.

As a result, the pay-as-you-go billing systems is likely to charge the users a fee for even the steal time, based on the execution time of a program including the steal time. That is, the accuracy of billing information for the users of a program decreases and, thus, it is difficult to ensure equity and fairness of billing for all the users of the program.

In addition, the performance of the program is likely to be analyzed based on the execution time of the program including the steal time and, thus, the performance of the program may not be analyzed accurately. For example, it is difficult to determine whether a decrease in the performance of the program is caused by the code of the program executed by the guest OS or control performed by the hypervisor. Thus, when a problem occurs in a VM, it may take a long time until the problem is solved.

According to the exemplary embodiment, an execution time correction method capable of accurately measuring the execution time of a program executed by a guest OS is described. While the exemplary embodiment is described with reference to an information processing apparatus 100 operating in a hypervisor-based virtual machine system, the exemplary embodiment is not limited thereto. For example, the information processing apparatus 100 operates even in a host OS-based virtual machine system in the same manner.

In an example illustrated in FIG. 1, the information processing apparatus 100 acquires sampling data. The sampling data indicates, for each of a predetermined interval of times, a program executed at the each time by the virtual machine program.

The sampling data includes the execution state of a program executed by a guest OS and sampled at, for example, 1 ms intervals. An example of the data indicating the execution state of the program is data for identifying a program currently executed by the guest OS. Alternatively, the data indicating the execution state of the program may be data indicating that the hypervisor sets the VM at a steal mode and, thus, the VM is suspended together with the guest OS and a program executed by the guest OS.

An example of acquisition of the sampling data performed by the information processing apparatus 100 is described below with reference to FIGS. 4 to 6. In addition, a technique for acquiring sampling data is described in, for example, Japanese Laid-open Patent Publication No. 2014-170482, U.S. Patent Publication No. 2014/0259011, or Yamamoto et al. "Unified Performance Profiling of an Entire Virtualized Environment", CANDAR, 2014.

For example, the program is a process, a thread in a process, or a function in a thread. More specifically, a process is a program which is a unit of execution within the OS. A thread is a program which is a unit of execution within a process, and a function is a program which is a unit of execution within a thread.

The information processing apparatus 100 identifies a period of time during which the guest OS is suspended, based on the acquired sampling data. The period of time during which the guest OS is suspended is the above-described steal time-period. In addition, the information processing apparatus 100 identifies a program being executed at least at one of times immediately before and immediately after a time period during which the guest OS is suspended. Thereafter, the information processing apparatus 100 generates data indicating a result of subtracting a time period during which the guest OS is suspended from a time period from the start of the program to the end of the program.

For example, the information processing apparatus 100 identifies, as a steal time-period, a time period during which data indicating that the hypervisor sets the VM at a steal mode and, thus, the VM is suspended together with the guest OS and a program executed by the guest OS are sampled.

Subsequently, the information processing apparatus 100 calculates the time length for the identified steal time-period.

In addition, the information processing apparatus 100 identifies a program PA being executed by the guest OS immediately before the identified steal time-period. That is, the information processing apparatus 100 identifies the program PA that is likely to be suspended in the identified steal time-period. Subsequently, the information processing apparatus 100 calculates the length of time from the start to the end of the identified program PA.

The length of time from the start to the end of the program PA may be calculated based on, for example, information regarding the Exit event of the program PA. Alternatively, the length of time from the start to the end of the program PA may be measured by, for example, the guest OS or the program PA. In the following description, the length of time from the start to the end of a program is also referred to as "apparent execution time of a program".

Subsequently, the information processing apparatus 100 generates data indicating a result of subtracting the time length for the identified steal time-period from the apparent execution time of the program PA. The information processing apparatus 100 outputs the generated data in association with the data for identifying the program PA.

In this manner, instead of calculating the apparent execution time, the information processing apparatus 100 may calculate the execution time of a program not including the steal time for the steal time-period. Thus, the information processing apparatus 100 may increase the accuracy of measurement of the execution time of a program. As a result, the information processing apparatus 100 provides a pay-as-you-go billing system based on the execution time of a program and facilitates the pay-as-you-go billing system to ensure the fairness to the users of the program.

In addition, the information processing apparatus 100 may accurately perform the performance analysis by using the execution time of a program not including the steal time. Alternatively, the information processing apparatus 100 may inform the user of the execution time of a program not including the steal time so that the user accurately analyzes the performance based on the execution time of the program.

Example of Hardware Configuration of Information Processing Apparatus

An example of the hardware configuration of the information processing apparatus 100 illustrated in FIG. 1 is described below with reference to FIG. 2.

Figure 2:
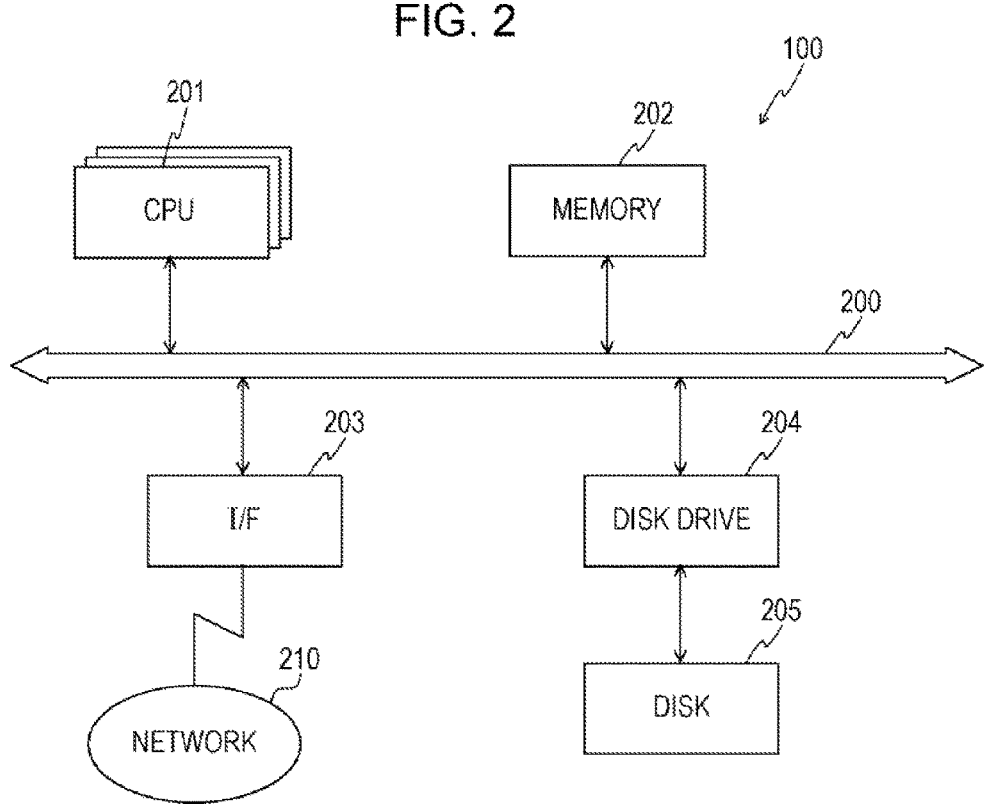
FIG. 2 is a diagram illustrating an example of a hardware configuration of an information processing apparatus, according to an embodiment.

FIG. 2 is a block diagram of the example of the hardware configuration of the information processing apparatus 100. As illustrated in FIG. 2, the information processing apparatus 100 includes a plurality of CPUs 201, a memory 202, an interface (I/F) 203, a disk drive 204, and a disk 205. These constituent elements are coupled to one another via a bus 200.

The CPUs 201 perform overall control of the information processing apparatus 100. The CPUs 201 execute a hypervisor that provides a virtual machine system. The hypervisor is a virtualization program that operates as an application program in the OS so that a guest OS is allowed to operate. In addition, the CPUs 201 include a context saving area and a control register for controlling the context saving area. Each time a process to be executed is switched to a different process, the CPUs 201 update the data in the control register by using information for identifying the process. When switching a VM to a different VM, the CPUs 201 save the information in the control register in the context saving area.

In addition, the CPUs 201 include a performance monitor counter for storing the count of hardware-related events. The performance monitor counter is used to check general system states and to compare the performance with the standard of performance. By using the function of the performance monitor counter, the processing performed by the information processing apparatus 100 is measured at intervals of 1 ms to 1 µs.

The memory 202 includes, for example, a read only memory (ROM), a random access memory (RAM), and a flash ROM. More specifically, for example, the flash ROM and the ROM are used to store programs, and the RAM is used as a work area of the CPUs 201. The programs stored in the memory 202 are loaded into the CPUs 201 so that the CPUs 201 perform the processing defined by the program code.

The I/F 203 is coupled to a network 210 via a communication line and is coupled to a different computer via the network 210. The I/F 203 controls interface between the network 210 and the inside of the information processing apparatus 100 to control the input and output of data from and to the different computer. An example of the I/F 203 is a modem or a local area network (LAN) adaptor.

The disk drive 204 controls a data read/write operation on the disk 205 under the control of the CPUs 201. The disk drive 204 is, for example, a magnetic disk drive. The disk 205 is a nonvolatile memory that stores data written thereto under the control of the disk drive 204. Examples of the disk 205 include a magnetic disk and an optical disk.

In addition to the above-described constituent elements, the information processing apparatus 100 may include, for example, a solid state drive (SSD), a semiconductor memory, a keyboard, a mouse, and a display. Instead of the disk drive 204 and the disk 205, the information processing apparatus 100 may include, for example, an SSD and a semiconductor memory.

Example of Functional Configuration of Information Processing Apparatus

An example of the functional configuration of the information processing apparatus 100 is described below with reference to FIG. 3.

Figure 3:
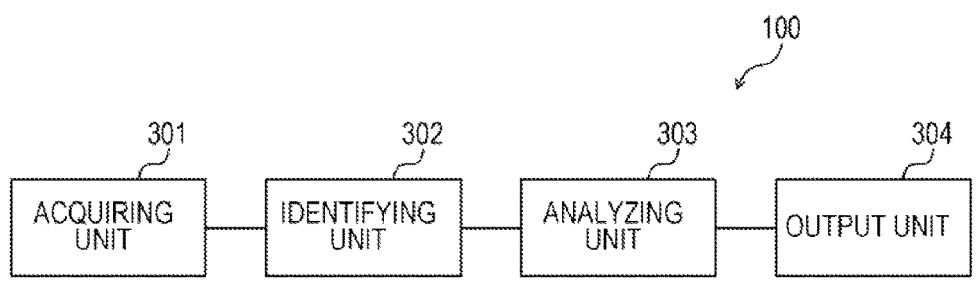
FIG. 3 is a diagram illustrating an example of a functional configuration of an information processing apparatus, according to an embodiment.

FIG. 3 is a block diagram illustrating an example of the functional configuration of the information processing apparatus 100. The information processing apparatus 100 includes an acquiring unit 301, an identifying unit 302, an analyzing unit 303, and an output unit 304. The acquiring unit 301, an identifying unit 302, an analyzing unit 303, and an output unit 304 are functions that serve as a control unit. The functions are provided by causing the CPUs 201 to execute a program stored in a storage unit (for example, the memory 202 and the disk 205 illustrated in FIG. 2) or by using the I/F 203. The result of processing performed by each of the constituent elements is stored in, for example, a storage area of the memory 202 or the disk 205.

The acquiring unit 301 acquires sampling data. The sampling data, which are sampled at predetermined time intervals, identify programs that are executed by the virtual machine program at the sampling time. The virtual machine program is a program that allows a virtual machine to operate. An example of the virtual machine program is a guest OS. The sampling data further include data for identifying a time period during which the virtual machine is suspended by a control program that controls the virtual machine. The control program that controls the virtual machine is a hypervisor or a host OS.

For example, the sampling data include data that indicate the execution states of a program executed by the guest OS and that are sampled at 1 ms intervals. The data that indicate the execution states of a program is, for example, data for identifying programs being executed by the guest OS. Alternatively, the data that indicate the execution states of a program may be data indicating that the hypervisor sets the VM at a steal mode and, thus, the VM is suspended together with the guest OS and the program executed by the guest OS. A program is, for example, a process, a thread in a process, or a function in a thread. This allows the acquiring unit 301 to output, to the identifying unit 302, the sampling data that is used by the identifying unit 302 to identify the steal time-period of a program.

While the exemplary embodiment has been described with reference to the acquiring unit 301 that acquires the sampling data 400 in the information processing apparatus 100, the processing of the acquiring unit 301 is not limited thereto. For example, the acquiring unit 301 may acquire the sampling data 400 for a different computer from the computer. In such a case, the information processing apparatus 100 is not a virtual machine system, but may be an analyzing apparatus that analyzes the virtual machine system.

The identifying unit 302 identifies the steal time-period during which the virtual machine program is suspended, based on the sampling data acquired by the acquiring unit 301. For example, the identifying unit 302 identifies a time period during which data that identifies a program being executed by the guest OS is not sampled since a point in time immediately after data that identifies a program being executed by the guest OS is sampled. In this manner, the identifying unit 302 may identify a steal time-period during which a program executed by the guest OS is suspended.

In addition, the identifying unit 302 identifies, for example, a time period during which the virtual machine is suspended as a time period during which the virtual machine program is suspended. For example, the identifying unit 302 identifies a time period during which data indicating that a guest OS and a program executed by the guest OS are suspended are sampled since a point in time immediately after data that identifies a program being executed by the guest OS is sampled. This allows the identifying unit 302 to identify a time period during which a program executed by the guest OS is suspended together with the VM by the hypervisor that sets the VM at a steal mode.

By using the sampling data acquired by the acquiring unit 301, the analyzing unit 303 identifies a program being executed immediately before or immediately after the virtual machine program identified by the identifying unit 302 is suspended. Thereafter, the analyzing unit 303 generates data indicating the result of subtracting, from the length of a time period from the start to the end of the identified program, the length of a time period during which the virtual machine program identified by the identifying unit 302 is suspended. The result of subtracting, from the length of a time period from the start to end of the identified program, the length of a time period identified by the identifying unit 302 is, for example, the execution time of the program.

For example, the analyzing unit 303 calculates the length of a first time period identified by the identifying unit 302, by multiplying the number of samples in the first time period among all the samples by the sampling interval (the sampling rate) 1 ms. In addition, the analyzing unit 303 calculates the length of a second time period from the start to the end of the program, based on, for example, the information regarding the Exit event of the program. Furthermore, the analyzing unit 303 may acquire, from the program or the guest OS, the length of the second time period from the start to the end of the program measured by the program or the guest OS.

Subsequently, the analyzing unit 303 subtracts the length of the first time period identified by the identifying unit 302 from the length of the second time period from the start to the end of the program to generate data indicating the execution time of the program. In this way, the analyzing unit 303 may exclude the steal time from the apparent execution time of the program and, thus, calculate the execution time of the program not including the steal time. As a result, the accuracy of measurement of the execution time of a program is increased.

By using the sampling data acquired by the acquiring unit 301, the analyzing unit 303 may identify a program that is being executed immediately before and immediately after the time period during which the virtual machine program identified by the identifying unit 302 is suspended. This allows the analyzing unit 303 to subtract the steal time for the steal time-period from the apparent execution time of the program when the same program is executed before and after the steal time-period.

In contrast, the analyzing unit 303 may stop subtracting, from the apparent execution time of any program, a steal time for a steal time-period that appears when a program is switched to a new program, since the steal time does not have an impact on the execution time of the program. In this case, the processing of the identifying unit 302 may be performed concurrently with the processing of the analyzing unit 303 while scanning the sampling data in time sequential order.

The output unit 304 outputs data identifying the program in association with data indicating a time-period identified by the identifying unit 302. An example of the data for identifying the program is the PID of a process. For example, the output unit 304 outputs data indicating the execution time of a process generated by the analyzing unit 303 in association with the PID of the process. For example, the output unit 304 may output the data to the display, output the data to a printer, send the data to an external device via the I/F 203, or store the data in the memory 202 or the disk 205.

In this manner, the output unit 304 may output the execution time of a program not including the steal time to easily ensure the fairness of charging for all users of the program in the pay-as-you-go billing system. In addition, the output unit 304 may output the execution time of a program not including the steal time to allow accurate analysis of the performance of the program.

Furthermore, the output unit 304 may inform the user of the execution time of a program not including the steal time, so that the user is aware that the hypervisor has set the VM at a steal mode during execution of the program and, thus, the program is suspended together with the VM. As a result, the user is able to accurately analyze the performance of the program based on the execution time of a program not including the steal time.

First Example of Operation Performed by Information Processing Apparatus

A first example of the operation performed by the information processing apparatus 100 is described below with reference to FIGS. 4 to 9.

Figure 4:
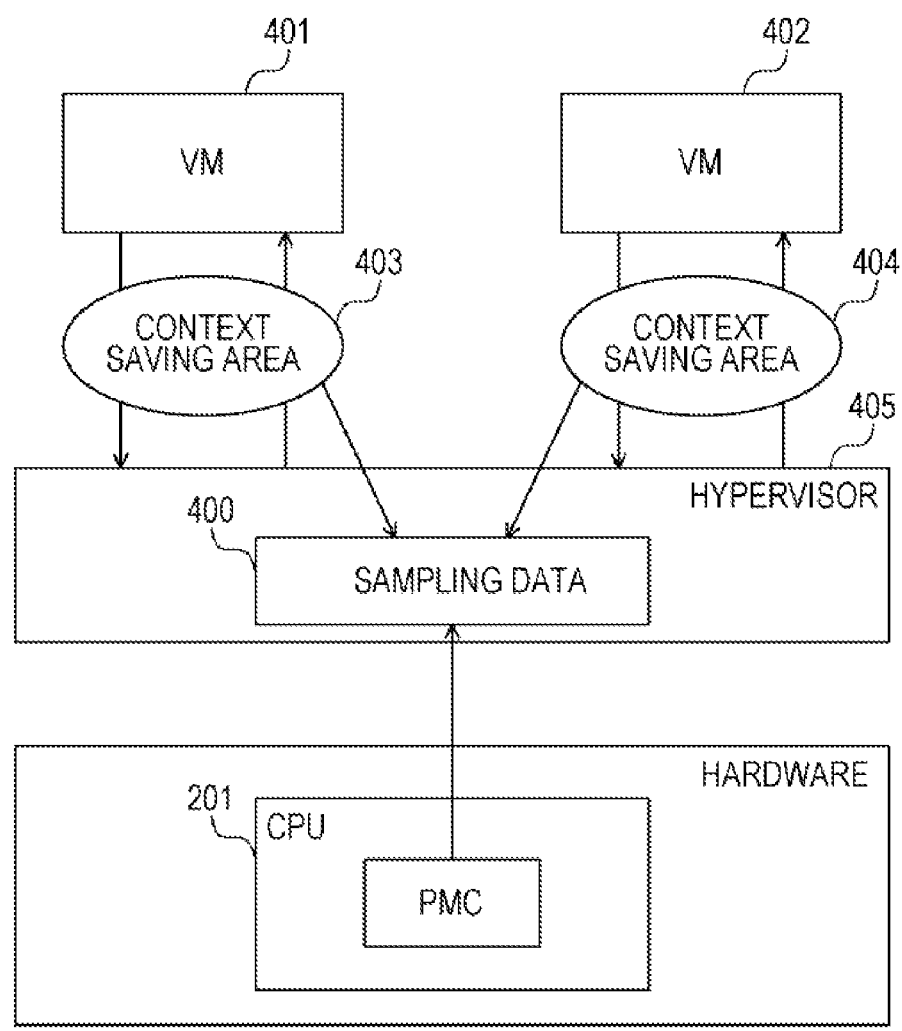
FIG. 4 is a diagram illustrating an example of acquisition of sampling data performed by an information processing apparatus, according to an embodiment.
Figure 5:
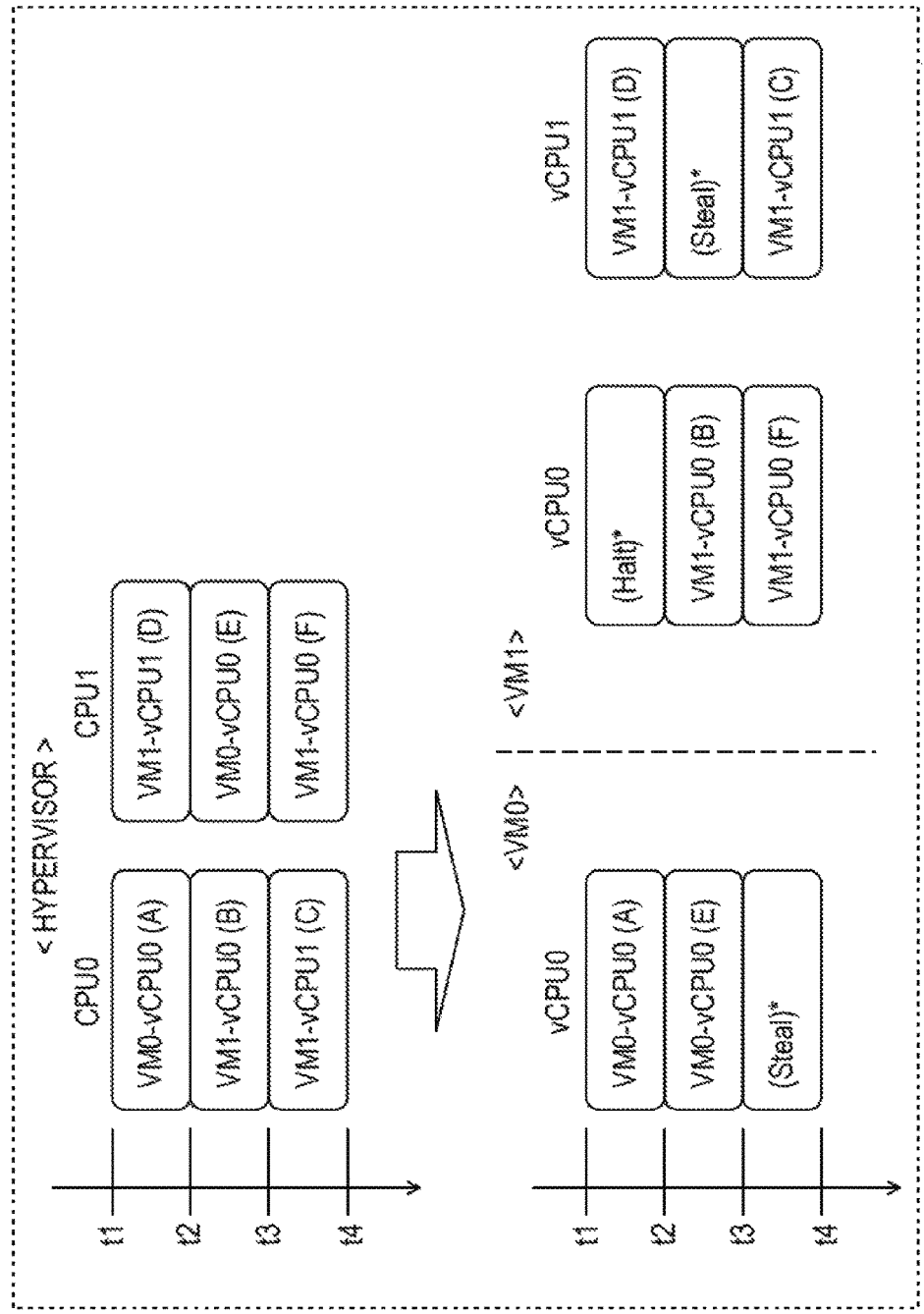
FIG. 5 is a diagram illustrating an example of acquisition of sampling data performed by an information processing apparatus, according to an embodiment.

Example of Acquisition of Sampling Data Performed by Information Processing Apparatus An example of acquisition of the sampling data 400 performed by the information processing apparatus 100 is described first with reference to FIGS. 4 and 5. A technique for acquiring the sampling data 400 by the information processing apparatus 100 is described in, for example, Japanese Laid-open Patent Publication No. 2014-170482, U.S. Patent Publication No. 2014/0259011, or Yamamoto et al. "Unified Performance Profiling of an Entire Virtualized Environment", CANDAR, 2014.

FIGS. 4 and 5 illustrate an example of acquisition of the sampling data 400 performed by the information processing apparatus 100. As illustrated in FIG. 4, a hypervisor 405 periodically receives an interruption signal from a performance monitor counter (PMC) and refers to context saving areas 403 and 404 to acquire trace information. The trace information includes information in which pieces of information regarding the processes performed by the hypervisor 405 are arranged in time sequential order and includes information regarding the processes in which the hypervisor 405 sent instructions to VMs 401 and 402.

For example, the trace information includes a VM number for identifying a process of each of the VMs 401 and 402 that are in execution when the VMs 401 and 402 receive an interruption signal, execution address values and page table address values acquired from the context saving areas 403 and 404, and the execution times of the processes. The periodical interruptions are made at predetermined sampling intervals. More specifically, the periodical interruptions are made at 1 ms intervals. In this manner, the information processing apparatus 100 is able to identify the processes performed by the VMs 401 and 402 among the processes performed by the hypervisor 405.

In addition, each of the VMs 401 and 402 acquires symbol map information including the process ID of a process performed by the guest OS, the instruction address, the name of the process, and the names of functions, and outputs the acquired symbol map information to the hypervisor 405. The hypervisor 405 generates analysis data based on the trace information and the symbol map information output from each of the VMs 401 and 402. The analysis data is formed from the samples that indicate the programs executed by each of the CPUs 201 at sampling intervals and that are arranged in time sequential order on a CPU basis. Thereafter, among the analysis data, the hypervisor 405 acquires the sampling data 400 formed by arranging the samples that indicate the programs being executed by each of the guest OSs and that are arranged in time sequential order on a guest OS basis.

More specifically, the hypervisor 405 sends, to each of the VMs 401 and 402, an instruction to start acquiring information. The hypervisor 405 periodically acquires the trace information in response to an interruption signal sent from the performance monitor counter. In addition, when the Exit event of a process in the hypervisor 405 occurs, the hypervisor 405 generates symbol map information regarding processes in the hypervisor 405. An example of the Exit event is termination of a process. The symbol map information includes information for identifying a process and information for identifying a function executed in the process.

Subsequently, the hypervisor 405 repeatedly collects the above-described trace information and symbol map information until collection of the sampling data 400 is completed. In addition, when a point of time when correction of the sampling data 400 ends is reached, the hypervisor 405 collects the information regarding all the processes being executed in the hypervisor 405. Thereafter, the hypervisor 405 generates the symbol map information for each of all the processes being executed in the hypervisor 405. Subsequently, the hypervisor 405 sends, to each of the VMs 401 and 402, an instruction to stop collection of the information. Subsequently, the hypervisor 405 stores the collected trace information and the generated symbol map information in the memory 202.

When an Exit event occurs after the VMs 401 and 402 receive the start instruction from the hypervisor 405, the VMs 401 and 402 generate symbol map information for a program designated as the target of an Exit event. Thereafter, upon receiving a termination instruction from the hypervisor 405, the VMs 401 and 402 generate symbol map information for each of all the processes being executed at that time. The VMs 401 and 402 output the generated symbol map information to the hypervisor 405.

The hypervisor 405 acquires the trace information and the symbol map information stored in the memory 202 and the symbol map information output from each of the VMs 401 and 402. The hypervisor 405 generates, using the acquired trace information and symbol map information, analysis data formed from pieces of information that indicate the programs executed by each of the CPUs 201 and that are arranged for each of CPUs 201. Hereinafter, an example of acquisition of the sampling data 400 performed by the information processing apparatus 100 based on the analysis data is described with reference to FIG. 5.

As illustrated in FIG. 5, the analysis data is formed from pieces of information that indicate the programs executed by each of the CPUs 201 and that are arranged in time sequential order for each of the CPUs 201. In the example illustrated in FIG. 5, for a CPU 0, the analysis data includes a sample group A for a virtual CPU (vCPU) 0 of a VM 0 during a period of time from t1 to t2, a sample group B for a virtual CPU 0 of a VM 1 during a period of time from t2 to t3, and a sample group C for a virtual CPU 1 of the VM 1 during a period of time from t3 to t4 in this order. In addition, for a CPU 1, the analysis data includes a sample group D for the virtual CPU 1 of the VM 1 during a period of time from t1 to t2, a sample group E for the virtual CPU 0 of the VM 0 during a period of time from t2 to t3, and a sample group F for the virtual CPU 0 of the VM 1 during a period of time from t3 to t4 in this order.

The information processing apparatus 100 acquires, from among the analysis data, the sampling data 400 formed from samples that indicate programs being executed by a guest OS and that are arranged in time sequential order for each of the guest OSs. For example, the information processing apparatus 100 re-arranges the samples in the analysis data in time sequential order for each of the virtual CPUs assigned to a guest OS on a VM.

More specifically, for the guest OS having the virtual CPU 0 of the VM 0 assigned thereto, the information processing apparatus 100 arranges the sample group A for the virtual CPU 0 of the VM 0 during the period of time from t1 to t2 and the sample group E for the virtual CPU 0 of the VM 0 during the period of time from t2 to t3 in this order. In addition, the information processing apparatus 100 identifies that no program is executed during the period of time from t3 to t4 and, thus, the period of time from t3 to t4 is a blank period.

The information processing apparatus 100 may refer to VM-Exit information included in the trace information and determine whether the blank period from t3 to t4 is a steal time-period controlled by the hypervisor 405 or a Halt time-period not controlled by the hypervisor 405. An example of the VM-Exit information is the information regarding the latest exit event of a VM.

In this example, the information processing apparatus 100 determines that the blank period from t3 to t4 is a steal time-period controlled by the hypervisor 405. Thereafter, the information processing apparatus 100 stores, as samples during the blank period from t3 to t4, information indicating being stolen in the sampling data 400. Similarly, the information processing apparatus 100 acquires the sampling data 400 for each of the virtual CPU 0 and the virtual CPU 1 of the VM 1.

While the above description has been given with regard to the information processing apparatus 100 that determines whether the blank period is a steal time-period or a halt time-period, the processing is not limited thereto. For example, the information processing apparatus 100 may consider the blank period as a steal time-period without determining whether the blank period is a steal time-period or a halt time-period. This allows the information processing apparatus 100 to reduce the amount of processing performed.

As described above, the information processing apparatus 100 is able to acquire the sampling data 400 without modifying the program of the guest OS. Accordingly, the information processing apparatus 100 is operable either in a fully-virtualized environment or in a para-virtualized environment. The term "fully-virtualized environment" refers to an environment in which the program of an OS widely used in a non-virtualized environment is used as a guest OS without modifying the program of the OS. The term "para-virtualized environment" refers to an environment in which the program of an OS widely used in a non-virtualized environment is modified so as to adapt to a virtualized environment and is used as a guest OS.

In this manner, the information processing apparatus 100 is applicable even when it is difficult for a guest OS to determine whether the guest OS is operated under the control of a hypervisor and, thus, it is difficult for the guest OS to start communicating with the hypervisor. Even in such a case, the information processing apparatus 100 is able to acquire the sampling data 400.

Example of Sampling Data

An example of the sampling data 400 acquired in FIGS. 4 and 5 is described below with reference to FIG. 6.

Figure 6:
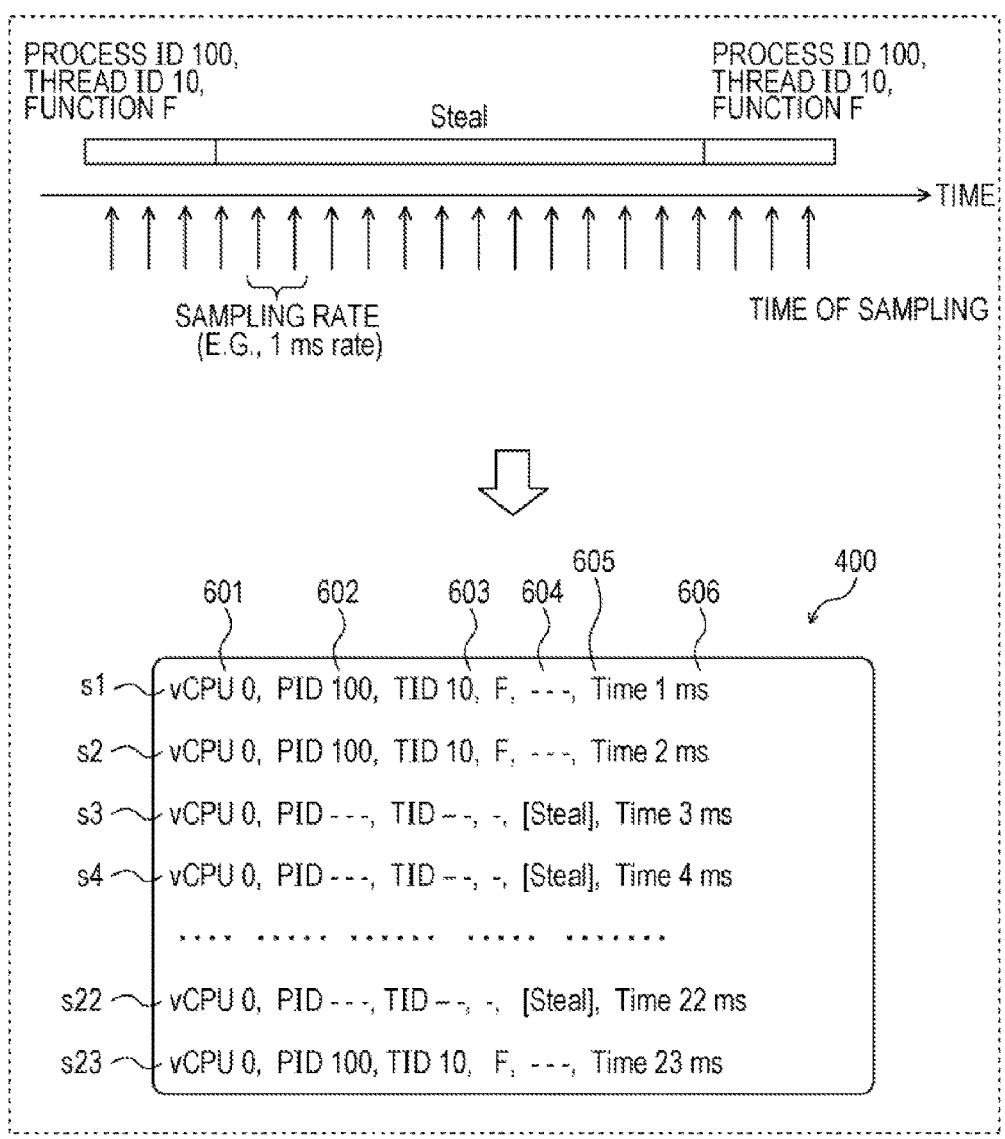
FIG. 6 is a diagram illustrating an example of sampling data, according to an embodiment.

FIG. 6 illustrates an example of the sampling data 400. The sampling data 400 is sampled at 1 ms intervals. The sampling data 400 includes a set of the identification information regarding a program being executed in a VM or information regarding a steal time. For example, the identification information includes a process ID, a thread ID, and a function ID. Hereinafter, a process ID and a thread ID are also simply referred to as "PID" and "TID", respectively.

More specifically, the sampling data 400 includes fields 602 to 606, which contain a PID, a TID, the name of a function, a steal flag, and the time of sampling, respectively, in association with a VM name field 601. Information is set in each of the fields 602 to 606 of the sampling data 400, for each of the VMs, so that samples s1 to s23 are stored in the form of records.

The information for identifying a VM is set in the VM name field 601. The information for identifying a process being executed by the virtual machine program at the time of sampling is set in the PID field 602. The information for identifying, among threads in the process, a thread executed by the virtual machine program at the time of sampling is set in the TID field 603. The information for identifying, among functions in the thread, a function being executed by the virtual machine program at the time of sampling is set in the function name field 604.

When there exists no programs executed by the virtual machine program and the VM is being stolen, at the time of sampling, no information is set in each of the PID field 602, the TID field 603, and the function name field 604, and information indicating that the VM is being stolen is set in the steal flag field 605. However, when the VM is not being stolen at the time of sampling, no information is set in the steal flag field 605.

Information indicating a point of time at which sampling is performed is set in the sampling time field 606. When sampling is performed at 1 ms intervals, the information indicating a point of time at which sampling is performed is information indicating a point of time that is incremented by 1 ms each time sampling is performed. Alternatively, information indicating a point of time at which sampling is performed may be a point of time that is acquired each time sampling is performed.

First Example of Calculation of Steal Time Performed by Information Processing Apparatus A first example of calculation of a steal time performed by the information processing apparatus 100 is described below with reference to FIGS. 7A to 7C and FIG. 8.

Figure 7A:
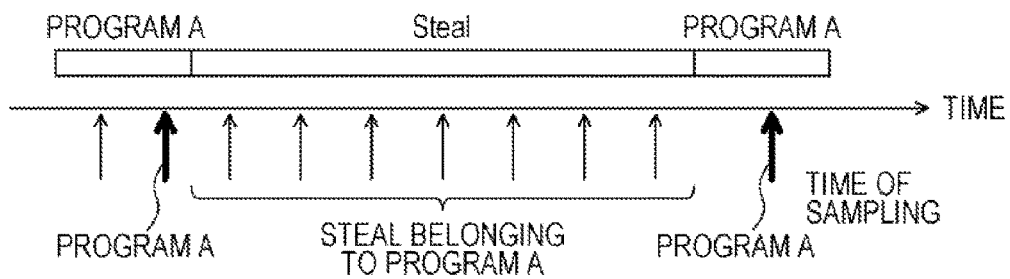
FIGS. 7A, 7B, and 7C are diagrams each illustrating an example of calculation of a steal time performed by an information processing apparatus, according to an embodiment.

FIGS. 7A to 7C and FIG. 8 illustrate the first example of calculation of a steal time performed by the information processing apparatus 100. FIG. 7A illustrates a case where the virtual machine program is stolen at the time of the program A being executed and, after the steal time-period, the program A is resumed. Accordingly, FIG. 7A illustrates a sequence of samples that includes, a plurality of samples each including information identifying the program A, a plurality of samples each including information indicating a steal, and a plurality of samples each including information identifying the program A, in this order.

In the example illustrated in FIG. 7A, the information processing apparatus 100 refers to the sampling data 400 and identifies, as a steal time-period during which the program A is suspended, a period of time in which the samples each including the information indicating a steal are sequentially arranged immediately after the samples each including the information identifying the program A. Hereinafter, a steal time-period during which a program is suspended is also referred to as a "steal time-period belonging to the program".

In this manner, the information processing apparatus 100 is able to identify a steal time-period belonging to a program for each of programs. That is, the information processing apparatus 100 may identify a steal time of the steal time-period belonging to the program, which is desired to be excluded from the program execution time. As a result, the information processing apparatus 100 is able to increase the accuracy of measurement of the execution time of a program.

Figure 7B:
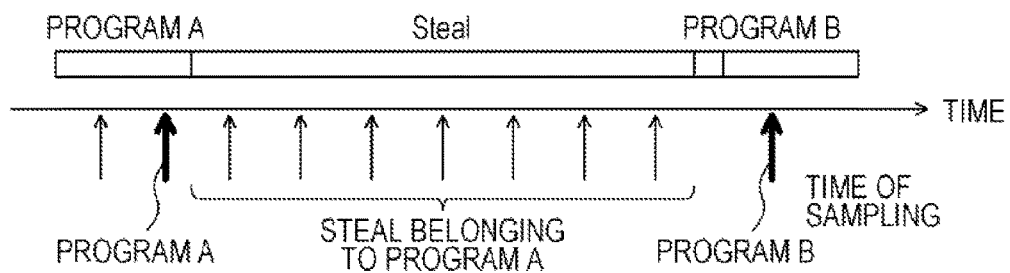

FIG. 7B illustrates a case where the virtual machine program is stolen at the time of the program A being executed and, immediately after the program A is resumed after the steal time-period, the program A is completed and a program B starts. Accordingly, FIG. 7B illustrates a sequence of samples that includes, a plurality of samples each including information identifying the program A, a plurality of samples each including information indicating a steal, and a plurality of samples each including information identifying the program B without including information identifying the program A, in this order.

In the example illustrated in FIG. 7B, the information processing apparatus 100 refers to the sampling data 400 and identifies, as a steal time-period belonging to the program A, a period of time during which a plurality of samples each including information indicating a steal are continuously arranged immediately after the samples each including the information identifying the program A.

In this manner, the information processing apparatus 100 is able to identify a steal time-period belonging to a program, for each of programs. That is, the information processing apparatus 100 is able to identify a program for which a steal time of the steal time-period is to be excluded from the execution time. As a result, the information processing apparatus 100 is able to increase the accuracy of measurement of the execution time of a program.

Figure 7C:
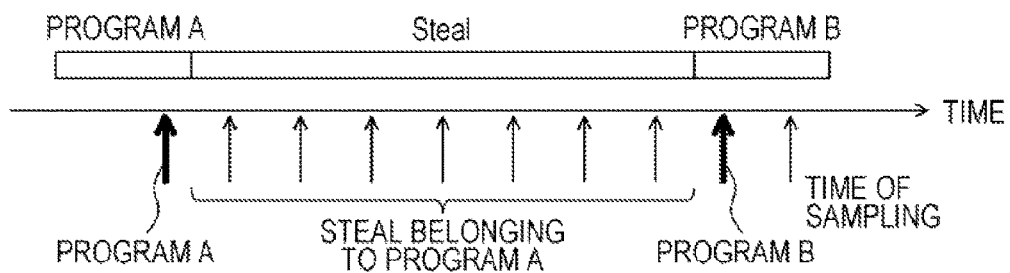

FIG. 7C illustrates a case where the virtual machine program is stolen at the completion of the program A, and the program B starts after the steal time-period. Accordingly, FIG. 7C illustrates a sequence of samples that includes, a plurality of samples each including information identifying the program A, a plurality of samples each including information indicating a steal, and a plurality of samples each including information identifying the program B, in this order.

In the example illustrated in FIG. 7C, the information processing apparatus 100 refers to the sampling data 400 and identifies, as a steal time-period belonging to the program A, a period of time during which a plurality of samples each including information indicating a steal are sequentially arranged immediately after the samples each including the information identifying the program A.

In this manner, the information processing apparatus 100 is able to identify a steal time-period belonging to a program, for each of programs. That is, the information processing apparatus 100 is able to identify a program for which a steal time of the steal time-period is to be excluded from the execution time. As a result, the information processing apparatus 100 is able to increase the accuracy of measurement of the execution time of a program. Next, FIG. 8 is described.

Figure 8:
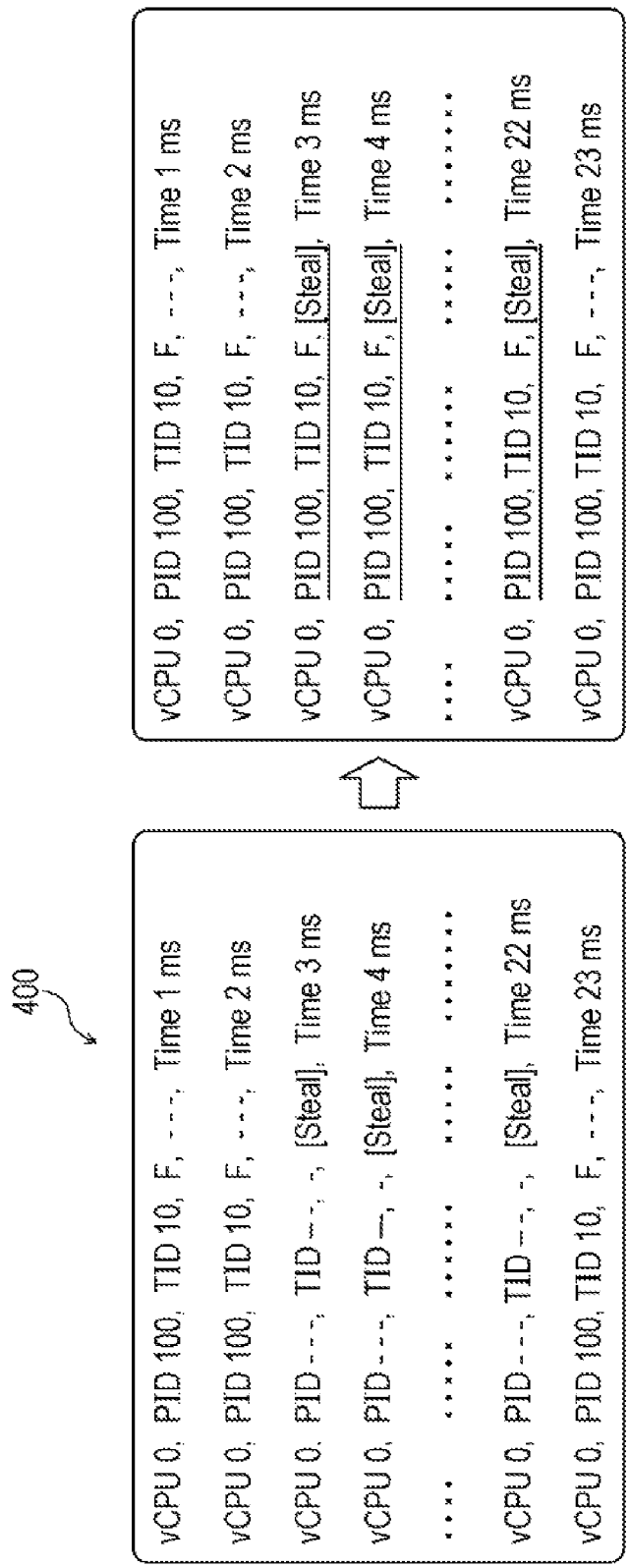
FIG. 8 is a diagram illustrating an example of calculation of a steal time performed by an information processing apparatus, according to an embodiment.

As illustrated in FIG. 8, after identifying a steal time-period belonging to a program, the information processing apparatus 100 adds information identifying the program to the samples collected during the steal time-period belonging to the program so that the sampling data 400 are updated. In the example illustrated in FIG. 8, the information processing apparatus 100 sets the PID "100", the TID "10", and the name of a function "F" in the PID field 602, the TID field 603, and the function name field 604 of each of the samples s3 to s22, respectively. This allows the information processing apparatus 100 to store a steal time-period for each of programs.

In addition, the information processing apparatus 100 calculates the execution time of a program executed by the guest OS for each of programs. For example, the information processing apparatus 100 calculates a steal time of $\Delta$steal_time(F) for each of the steal time-periods included in the execution time of the function F, by using the following equation:

$$\Delta\text{steal\_time}(F)=\Delta\text{number\_of\_sampling}(A)\times\text{sampling\_rate\_time} \quad (1)$$

where $\Delta$number_of_sampling(A) is the number of samples in the steal time-period for the function F, and sampling_rate_time is the sampling interval. The sampling interval is, for example, 1 ms.

Subsequently, the information processing apparatus 100 calculates a steal_time(F) of the function F, $\Sigma\Delta$steal_time(F) which is the sum of $\Delta$steal_time(F)s of the steal time-periods included in the execution period of the function F, by using the following equation:

$$\text{steal\_time}(F)=\Sigma\Delta\text{steal\_time}(F)= (\Sigma\Delta\text{number\_of\_sampling}(A))\times\text{sampling\_rate\_time} \quad (2)$$

Similarly, the information processing apparatus 100 calculates a steal_time(P) of a process P by using the following equation:

$$\text{steal\_time}(P)=\Sigma\Delta\text{steal\_time}(P) \quad (3)$$

where $\Delta$steal_time(P) is the length of time for each of the steal time-periods included in the execution period of the process P.

In addition, the information processing apparatus 100 calculates a steal_time(T) of a thread T by using the following equation:

$$\text{steal\_time}(T)=\Sigma\Delta\text{steal\_time}(T) \quad (4)$$

where $\Delta$steal_time(T) is the length of time for each of the steal time-period included in the execution period of the thread T.

In this manner, the information processing apparatus 100 is able to calculate an execution time of a program executed by the guest OS, for each of programs, by excluding a steal time from the execution time. Thus, the information processing apparatus 100 is able to accurately calculate the execution time of a program.

While the above description has been given with reference to the case in which the sampling interval is fixed at, for example, a 1 ms interval, the sampling interval is not limited thereto. For example, in some cases, the sampling interval may vary due to an error. Accordingly, the information processing apparatus 100 may employ, as the information indicating a point of time at which sampling has been performed in the sampling data 400, a time that is acquired each time the sampling is performed. In this manner, the information processing apparatus 100 is able to increase the accuracy of calculation of the execution time of a program.

For example, the information processing apparatus 100 calculates a difference between points of time of samplings as a sampling interval. The information processing apparatus 100 sums the sampling intervals from the first to last samples within a steal time-period to calculate the length of time $\Delta$steal_time for the steal time-period. Thereafter, the information processing apparatus 100 calculates the steal time(F) of the function F, the steal time(P) of the process P, and the steal time(T) of the thread T by using the above-described equations (2) to (4).

Alternatively, the information processing apparatus 100 may calculate a difference between the first point of time and the last point of time of sampling in a steal time-period as the length of time, $\Delta$steal_time, for the steal time-period. In the case, the information processing apparatus 100 may calculate a steal time after reading the entire sampling data 400, or may calculate a steal time while scanning the sampling data 400 in time sequential order.

First Calculation Procedure

An example of a first calculation procedure is described below with reference to FIG. 9.

FIG. 9 is a flowchart illustrating an example of the first calculation procedure. As illustrated in FIG. 9, the information processing apparatus 100 sets a variable n at 0 (n=0)

(step S901). Thereafter, the information processing apparatus 100 reads one of the time-series samples from the sampling data 400 in time sequential order (step S902).

Subsequently, the information processing apparatus 100 determines whether a read sample is present (step S903). When a read sample is present (Yes in step S903), the information processing apparatus 100 determines whether the read sample indicates a steal (step S904). When the read sample does not indicate a steal (No in step S904), the information processing apparatus 100 stores the PID, the TID, and the name of a function of the read sample as the identification information of the immediately previous program (step S905). Thereafter, the processing returns to step S902.

On the other hand, when the read sample indicates a steal (Yes in step S904), the information processing apparatus 100 sets the variable n at n+1 (n=n+1) (step S906). Thereafter, the information processing apparatus 100 reads, from the sampling data 400, one of the time-series samples in time sequential order (step S907). Thereafter, the information processing apparatus 100 determines whether the read sample indicates a steal (step S908). When the read sample indicates a steal (Yes in step S908), the processing of the information processing apparatus 100 returns to step S906.

Meanwhile, when the read sample does not indicate a steal (No in step S908), the information processing apparatus 100 sums steal times of a program for each of programs, based on the variable n and the identification information identifying the immediately previous program, by using, for example, the above-described equations (1) to (4) (step S909). Thereafter, the information processing apparatus 100 sets the variable n at 0 (n=0) (step S910). Subsequently, the processing of the information processing apparatus 100 returns to step S902.

Meanwhile, when, in step S903, a read sample is not present (No in step S903), the information processing apparatus 100 calculates the execution time for each of programs, based on the steal time summed for each of programs (step S911), and the first calculation procedure is completed. In this manner, the information processing apparatus 100 calculates the execution time not including the steal time for each of programs. As a result, the accuracy of measurement of the execution time of a program is increased.

Second Example of Operation Performed by Information Processing Apparatus

A second example of the operation performed by the information processing apparatus 100 is described below with reference to FIGS. 10A to 10C and FIG. 11.

Figure 10A:
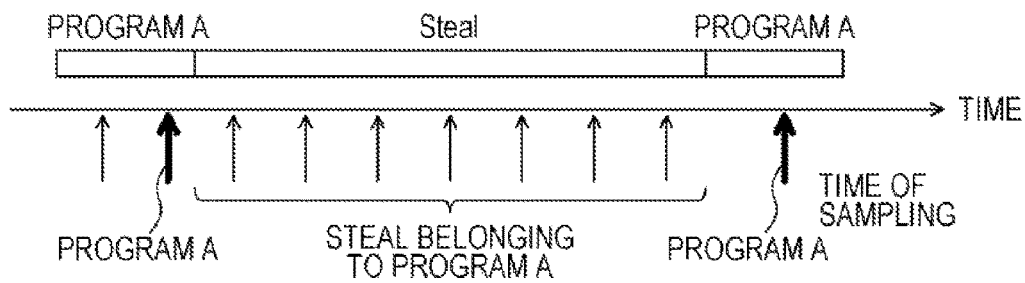
FIGS. 10A, 10B, and 10C are diagrams each illustrating an example of calculation of a steal time performed by an information processing apparatus, according to an embodiment.
Figure 10B:
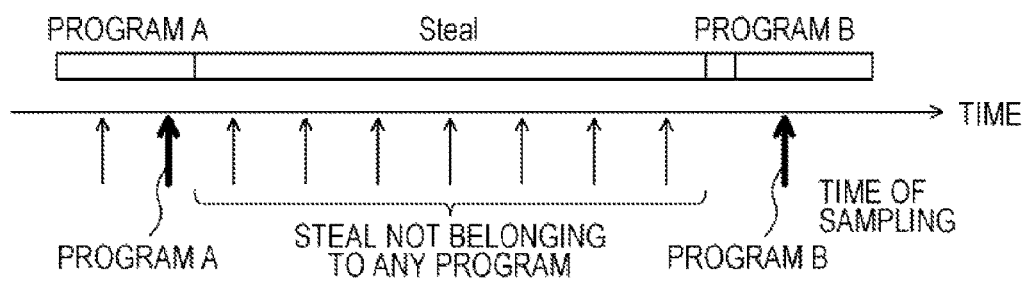
Figure 10C:
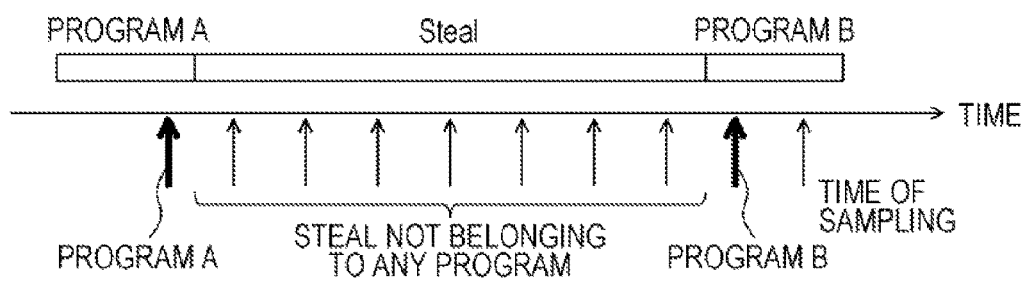

Second Example of Calculation of Steal Time Performed by Information Processing Apparatus The second example of calculation of a steal time performed by the information processing apparatus 100 is described first with reference to FIGS. 10A to 10C.

FIGS. 10A to 10C illustrate the second example of calculation of a steal time performed by the information processing apparatus 100. When a program is stolen at the time of completion of the program and execution of another program is started after the steal time-period, the steal time-period has no impact on any program. That is, the steal time-period does not belong to any program.

Accordingly, in the second example of the operation, the information processing apparatus 100 is configured to identify a steal time-period that does not belong to any program, and configured not to exclude, from the apparent execution time of any program, the steal time for the steal time-period that does not belong to any program.

FIG. 10A illustrates a case where the virtual machine program is stolen at the time of the program A being executed, and the program A is resumed after the steal time-period. Accordingly, FIG. 10A illustrates a sequence of samples that include a first plurality of samples each including information identifying the program A, a second plurality of samples each including information indicating a steal, and a third plurality of samples each including information identifying the program A, in this order.

In the example illustrated in FIG. 10A, the information processing apparatus 100 refers to the sampling data 400 and identifies a period of time in which a plurality of samples each including information indicating a steal are sequentially arranged and which is sandwiched by the samples each including information identifying the program A. Thereafter, the information processing apparatus 100 considers the identified period of time as a steal time-period.

In this manner, the information processing apparatus 100 may identify, for each of programs, a steal time-period belonging to the each program. That is, the information processing apparatus 100 may identify a steal time for the steal time-period belonging to a program, which is desired to be excluded from the program execution time. As a result, the information processing apparatus 100 is able to increase the accuracy of measurement of the execution time of a program.

FIG. 10B illustrates a case where the virtual machine program is stolen at the time of the program A being executed and the program B is started immediately after the program A is resumed after the steal time-period. Accordingly, FIG. 10B illustrates a sequence of samples that include a first plurality of samples each including information identifying the program A, a second plurality of samples each including information indicating a steal, and a third plurality of samples each including information identifying the program B, in this order, without including any sample including information identifying the program A between the second plurality of samples and the third plurality of samples.

In the example illustrated in FIG. 10B, the information processing apparatus 100 refers to the sampling data 400 and identifies samples each including information identifying the program A and samples each including information identifying the program B. Thereafter, the information processing apparatus 100 identifies a period of time in which a plurality of samples each including information indicating a steal are sequentially arranged and which is sandwiched by the samples each including information identifying the program A and the samples each including information identifying the program B. Thereafter, the information processing apparatus 100 considers the identified period of time as a steal time-period not belonging to any program.

In this manner, the information processing apparatus 100 may identify a steal time-period not belonging to any program. That is, the information processing apparatus 100 may identify a steal time for the steal time-period not belonging to any program, which is not required to be excluded from the execution time of the program. As a result, the information processing apparatus 100 is able to increase the accuracy of measurement of the execution time of a program.

FIG. 10C illustrates a case where the virtual machine program is stole at the completion of the program A and, after the steal time-period, the program B starts. Accordingly, FIG. 10C illustrates a sequence of samples that includes a first plurality of samples each including information identifying the program A, a second plurality of samples each including information indicating a steal, and a third plurality of samples each including information identifying the program B, in this order.

In the example illustrated in FIG. 10C, the information processing apparatus 100 refers to the sampling data 400 and identifies samples each including information identifying the program A and samples each including information identifying the program B. Thereafter, the information processing apparatus 100 identifies a period of time in which samples each including information indicating a steal are sequentially arranged and which is sandwiched by the samples each including information identifying the program A and the samples each including information for identifying the program B. Thereafter, the information processing apparatus 100 determines the identified period of time to be a steal time-period not belonging to any program.

In this manner, the information processing apparatus 100 may identify the steal time-period not belonging to any program. That is, the information processing apparatus 100 may identify the length of steal time for the steal time-period not belonging to any program, that is, the length of steal time that is not required to be excluded from the program execution time. As a result, the information processing apparatus 100 is able to increase the accuracy of measurement of the execution time of a program.

Subsequently, like the first example of the operation, the information processing apparatus 100 adds information identifying a program to a sample in the sampling data 400. In this manner, the information processing apparatus 100 updates the sampling data 400. In addition, like the first example of the operation, the information processing apparatus 100 measures the execution time of a program executed by a guest OS for each of programs. As a result, the information processing apparatus 100 is able to accurately measure, for each of programs, the execution time of the each program executed by the guest OS.

Second Calculation Procedure

An example of a second calculation procedure is described below with reference to FIG. 11.

FIG. 11 is a flowchart illustrating the example of the second calculation procedure. As illustrated in FIG. 11, the information processing apparatus 100 sets a variable n at 0 (n=0) (step S1101). Thereafter, the information processing apparatus 100 reads one of the time-series samples in the sampling data 400 in time sequential order (step S1102).

Subsequently, the information processing apparatus 100 determines whether a read sample is present (step S1103). When a read sample is present (Yes in step S1103), the information processing apparatus 100 determines whether the read sample indicates a steal (step S1104). When the read sample does not indicate the steal (No in step S1104), the information processing apparatus 100 stores the PID, the TID, and the function name of the read sample as the identification information identifying the immediately previous program (step S1105). Thereafter, the processing of the information processing apparatus 100 returns to step S1102.

On the other hand, when the read sample indicates a steal (Yes in step S1104), the information processing apparatus 100 sets the variable n at n+1 (n=n+1) (step S1106). Thereafter, the information processing apparatus 100 reads, from the sampling data 400, one of the time-series samples in time sequential order (step S1107). Thereafter, the information processing apparatus 100 determines whether the read sample indicates a steal (step S1108). When the read sample indicates a steal (Yes in step S1108), the processing of the information processing apparatus 100 returns to step S1106.

On the other hand, when the read sample does not indicate a steal (No in step S1108), the information processing apparatus 100 determines whether the PID, the TID, and the function name of the read sample are the same as those in the identification information identifying the immediately previous program (step S1109). When the PID, the TID, and the function name of the read sample are not the same as those in the identification information identifying the immediately previous program (No in step S1109), the processing of the information processing apparatus 100 proceeds to step S1111.

When the PID, the TID, and the function name of the read sample are the same as those in the identification information identifying the immediately previous program (Yes in step S1109), the information processing apparatus 100 sums the lengths of steal times for a program, based on the variable n and the identification information identifying the immediately previous program, by using, for example, the above-described equations (1) to (4) (step S1110). Thereafter, the information processing apparatus 100 sets the variable n at 0 (n=0) (step S1111). Subsequently, the processing of the information processing apparatus 100 returns to step S1102.

Meanwhile, when, in step S1103, a read sample is not present (No in step S1103), the information processing apparatus 100 calculates the execution time, for each of programs, by using the length of steal times summed for each of programs (step S1112), and the second calculation procedure is completed. In this manner, the information processing apparatus 100 may calculate the execution time not including the steal time for each of programs. As a result, the accuracy of measurement of the execution time of a program is increased.

Third Example of Operation Performed by Information Processing Apparatus

A third example of the operation performed by the information processing apparatus 100 is described below with reference to FIGS. 12 and 13. Like the first and second examples of the operation, the information processing apparatus 100 identifies a steal time-period belonging to a program and adds the information identifying a program to the samples obtained during the steal time-period belonging to the program. In this manner, the information processing apparatus 100 updates the sampling data 400.

Third Example of Calculation of Steal Time Performed by Information Processing Apparatus The third example of calculation of a steal time performed by the information processing apparatus 100 is described below with reference to FIG. 12.

FIG. 12 illustrates the third example of calculation of a steal time performed by the information processing apparatus 100. Unlike the first and second examples of the operation, the information processing apparatus 100 may calculate the steal time by performing profile analysis.

For example, among the samples in the sampling data 400, the information processing apparatus 100 measures the ratio of the number of samples each having "PID=P, TID=T, and Function Name=F, [Steal]" to the number of all the samples as %(PID=P, TID=T, and Function Name=steal(F)).

Thereafter, the information processing apparatus 100 calculates a steal_time(F) of the function F by using the following equation:

$$\text{steal\_time}(F) = \text{time}(F) \times \%(\text{PID}=P, \text{TID}=T, \text{ and Function Name}=\text{steal}(F)) \quad (5)$$

Similarly, among the samples in the sampling data 400, the information processing apparatus 100 measures the ratio of the number of samples each having "PID=P, [steal]" to the number of all the samples as %(PID=steal(P)). Thereafter, the information processing apparatus 100 calculates a steal_time(P) of the process P using the following equation:

$$\text{steal\_time}(P) = \text{time}(P) \times \%(\text{PID}=\text{steal}(P)) \quad (6)$$

where time(P) is a length of time from the start of the process P to completion.

Similarly, among the samples in the sampling data 400, the information processing apparatus 100 measures the ratio of the number of samples each having "PID=P, TID=T, [steal]" to the number of all the samples as %(PID=P, TID=steal(T)). Thereafter, the information processing apparatus 100 calculates a steal_time(T) of the thread T using the following equation:

$$\text{steal\_time}(T) = \text{time}(T) \times \%(\text{PID}=P, \text{TID}=\text{steal}(T)) \quad (7)$$

where time(T) is a length of time from the start of the thread T to completion.

Third Calculation Procedure

An example of a third calculation procedure is described below with reference to FIG. 13.

FIG. 13 is a flowchart illustrating the example of the third calculation procedure. As illustrated in FIG. 13, the information processing apparatus 100 reads one of the time-series samples in the sampling data 400 in time sequential order (step S1301).

Subsequently, the information processing apparatus 100 determines whether a read sample is present (step S1302). When a read sample is present (Yes in step S1302), the information processing apparatus 100 determines whether the read sample indicates a steal (step S1303). When the read sample does not indicate the steal (No in step S1303), the processing of the information processing apparatus 100 proceeds to step S1307.

On the other hand, when the read sample indicates a steal (Yes in step S1303), the information processing apparatus 100 adds the PID, the TID, and the function name of the read sample to the read sample. Thus, the information processing apparatus 100 updates the sampling data 400 (step S1304).

Subsequently, the information processing apparatus 100 reads one of the time-series samples from the sampling data 400 in time sequential order (step S1305). Thereafter, the information processing apparatus 100 determines whether the read sample indicates a steal (step S1306). When the read sample indicates a steal (Yes in step S1306), the processing of the information processing apparatus 100 returns to step S1304.

When the read sample does not indicate a steal (No in step S1306), the information processing apparatus 100 stores the PID, the TID, and the function name of the read sample as the identification information identifying the immediately previous program (step S1307). Thereafter, the processing of the information processing apparatus 100 returns to step S1301.

However, if, in step S1302, a read sample is not present (No in step S1302), the information processing apparatus 100 completes the third calculation procedure. In this manner, the information processing apparatus 100 may perform the profile analysis and calculate the ratio of the number of samples for the steal time-period to all the samples in the sampling data 400 for each of programs. Thus, the information processing apparatus 100 is able to calculate the steal time for each of programs.

As described above, according to the information processing apparatus 100, the sampling data 400 indicating the program being executed by the virtual machine program may be acquired at predetermined time intervals. Subsequently, according to the information processing apparatus 100, a time-period during which the virtual machine program is suspended may be identified based on the sampling data 400. In addition, according to the information processing apparatus 100, a program that is executed immediately before or immediately after the time-period during which the virtual machine program is suspended may be identified based on the sampling data 400.

Subsequently, the information processing apparatus 100 may generate data indicating a result of subtracting the length of time for the time-period during which the virtual machine program is suspended, from the length of time from the start of the program to the completion thereof, based on the sampling data 400. Thus, the information processing apparatus 100 may output the data in association with information identifying the program. In this manner, the information processing apparatus 100 may calculate the steal time and calculate the execution time of a program not including the steal time. As a result, the accuracy of measurement of the execution time of a program is increased.

In addition, the information processing apparatus 100 may generate data indicating a result of subtracting, from the length of time from the start to the end of a program being executed immediately before and immediately after the time-period during which the virtual machine program is suspended, the length of time for the time-period, based on the acquired sampling data 400. Thereafter, the information processing apparatus 100 may output the generated data in association with information identifying the program. In this manner, the information processing apparatus 100 does not subtract, from the length of time from the start to the end of the program, the length of time for a steal time-period appearing between switching of programs. As a result, the accuracy of measurement of the execution time of a program is increased.

Furthermore, according to the information processing apparatus 100, a time-period during which the virtual machine is suspended may be employed as a time-period during which the virtual machine program is suspended. Thus, the information processing apparatus 100 may exclude, from a steal time-period, a time-period during which the virtual machine program is suspended without being controlled by the hypervisor. As a result, the accuracy of measurement of the execution time of a program is increased.

Still furthermore, according to the information processing apparatus 100, as a program for which data indicating the execution time is generated, at least one of a process, a thread in a process, and a function in a thread may be employed. Thus, the information processing apparatus 100 may calculate the execution time not including a steal time for each of the programs of different execution types.

Note that the execution time correction method described in the exemplary embodiment may be provided by executing a prepared program using a computer, such as a personal computer or a workstation. The execution time correction program is stored in a computer-readable recording medium, such as a hard disk, a flexible disk, a compact disc read only memory (CD-ROM), a magneto-optical disk (MO), or a digital versatile disc (DVD), and is read out of the recording medium by the computer. In this manner, the execution time correction program is executed by the computer. Alternatively, the execution time correction program may be distributed via a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
    a processor configured to:
        accumulate sampling data by causing a control program for controlling virtual machines to sample a sample data item at a predetermined interval for each of programs currently executed by the virtual machines, the control program being executed outside the virtual machines, the sample data item including identification information identifying each program currently executed by a virtual machine and steal-time information indicating whether the sample data item is sampled within a steal time-period during which a virtual machine program to operate the virtual machine is suspended by the control program, the sampling data including first and second sample data items with first and second steal-time information for first and second virtual machines, respectively,
        acquire, from the sampling data, the first sample data item including first identification information identifying a first program among programs being executed during each of a plurality of sampling intervals by the first virtual machine,
        determine, based on the first steal-time information included in the first sample data item, whether the first sample data item is sampled within a first steal time-period during which the virtual machine program to operate the first virtual machine is suspended, and
        when the first sample data item is sampled at a sample time before or after the first steal time-period, output, in association with the first identification information identifying the first program, an effective execution time-period of the first program indicating a result of subtracting the first steal time-period from an apparent execution time of the first program which indicates an execution time-period from a start time of starting execution of the first program to an end time of ending execution of the first program; and
    a memory coupled to the processor and configured to store the sampling data.

2. The apparatus of claim 1, wherein, when a second program is executed both at a first time before and at a second time after the first steal time-period, the processor outputs, in association with second identification information identifying the second program, the effective execution time-period of the second program indicating a result of subtracting the first steal time-period from the apparent execution time of the second program.

3. The apparatus of claim 1, wherein
    the first sample data item includes the first steal-time information indicating whether the first sample data item is sampled within a second steal time-period during which the first virtual machine is suspended by a control program that controls the first virtual machine; and
    the second steal time-period is used as the first steal time-period.

4. The apparatus of claim 1, wherein each of the programs is at least one of a process, a thread in a process, and a function in a thread.

5. The apparatus of claim 1, wherein the apparent execution time of the first program is obtained by multiplying the sampling interval times a number of samples identifying the first program as being executed during the execution time-period.

6. A method comprising:
    accumulating sampling data by causing a control program for controlling virtual machines to sample a sample data item at a predetermined interval for each of programs currently executed by the virtual machines, the control program being executed outside the virtual machines, the sample data item including identification information identifying each program currently executed by a virtual machine and steal-time information indicating whether the sample data item is sampled within a steal time-period during which a virtual machine program to operate the virtual machine is suspended by the control program, the sampling data including first and second sample data items with first and second steal-time information for first and second steal time-periods of first and second virtual machines, respectively;
    acquiring, from the sampling data, the first sample data item including first and second identification information identifying first and second programs being executed during plurality of sampling intervals by the first virtual machine;
    determining, based on the first steal-time information included in the first sample data item, whether the first sample data item is sampled within the first steal time-period during which the virtual machine program to operate the first virtual machine is suspended; and
    when the first sample data item is sampled at a sample time before or after the first steal time-period, outputting, in association with the first identification information identifying the first program, an effective execution time-period of the first program indicating a result of subtracting the first steal time-period from an apparent execution time of the first program which indicates an execution time-period from a start time of starting execution of the first program to an end time of ending execution of the first program.

7. The method of claim 6, wherein the apparent execution time of the first program is obtained by multiplying the sampling interval times a number of samples identifying the first program as being executed during the execution time-period.

8. A non-transitory, computer-readable recording medium having stored therein a program for causing a computer to execute a process comprising:
    accumulating sampling data by causing a control program for controlling virtual machines to sample a sample data item at a predetermined interval for each of programs currently executed by the virtual machines, the control program being executed outside the virtual machines, the sample data item including identification information identifying each program currently executed by a virtual machine and steal-time information indicating whether the sample data item is sampled within a steal time-period during which a virtual machine program to operate the virtual machine is suspended by the control program, the sampling data including first and second sample data items with first and second steal-time information for first and second steal time-periods of first and second virtual machines, respectively;

acquiring, from the sampling data, the first sample data item including first and second identification information identifying first and second programs being executed during a plurality of sampling intervals by the first virtual machine;

determining, based on the first steal-time information included in the first sample data item, whether the first sample data item is sampled within the first steal time-period during which the virtual machine program to operate the first virtual machine is suspended; and when the first sample data item is sampled at a sample time before or after the first steal time-period, outputting, in association with the first identification information identifying the first program, an effective execution time-period of the first program indicating a result of subtracting the first steal time-period from an apparent execution time of the first program which indicates an execution time-period from a start time of starting execution of the first program to an end time of ending execution of the first program.

9. The non-transitory, computer-readable recording medium of claim 8, wherein the apparent execution time of the first program is obtained by multiplying the sampling interval times a number of samples identifying the first program as being executed during the execution time-period.

* * * * *